J. DODDS.
APPARATUS FOR WASHING COAL.
APPLICATION FILED MAR. 13, 1911.

998,163.

Patented July 18, 1911.

Witnesses:
P. F. Nagle
L. Douville

Inventor
Joseph Dodds
By Wiedersheim & Fairbanks
Attorneys.

COLUMBIA PLANOGRAPH CO., WASHINGTON, D. C.

UNITED STATES PATENT OFFICE.

JOSEPH DODDS, OF RUTHERGLEN, SCOTLAND.

APPARATUS FOR WASHING COAL.

998,163.  Specification of Letters Patent.  Patented July 18, 1911.

Application filed March 13, 1911. Serial No. 614,013.

*To all whom it may concern:*

Be it known that I, JOSEPH DODDS, a subject of the King of Great Britain, residing at Rutherglen, Scotland, have invented a certain new and useful Improved Apparatus for Washing Coal, of which the following is a specification.

This invention relates to an apparatus for washing coal.

Under the present invention the washer comprises a vessel or tank of circular shape, which is, preferably, tapered from top to bottom. Mounted centrally in this vessel is a vertical shaft which is rotated by means of suitable gearing and on the shaft is a disk or table whose external diameter is somewhat less than the internal diameter of the vessel or tank, this disk being perforated and having, at its underside, a series of radial and depending blades or vanes. Below this disk or table is a water inlet to which water under pressure is supplied by means of a pipe provided with a controlling cock or valve, and, secured to the internal wall of the vessel so as to be just above the surface of the disk, is an inwardly projecting sweep which is arranged at the side of an opening at, or about, the level of the disk for the passage, from the vessel, of the dirt which is washed from the coal. At a suitable part of the vessel, at or near to the top thereof, is an outlet for the coal and the overflow water, and, arranged so as to project inwardly from this opening is a sweep which is, or may be, perforated and which may be of curved shape and may extend inwardly from the internal wall of the vessel to the vertical shaft at the axis of the vessel. This sweep may be tapered from the center of the vessel to the axis thereof and has, projecting from its outer portion an inclined plate or platform which is at right angles to the sweep, and is, preferably, perforated, and means are also provided for retarding the circular motion of the coal in the washer.

In order that my invention may be clearly understood I have appended an explanatory sheet of drawings whereon I have shown, by way of illustration or example, the preferred method of carrying out my invention.

Figure 1:
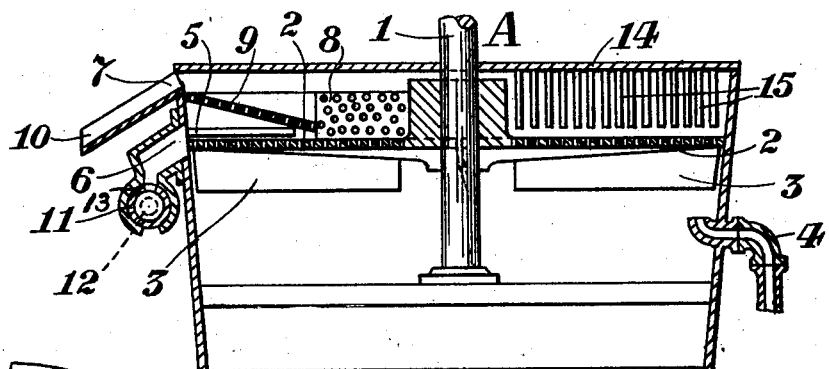
Figure 3:
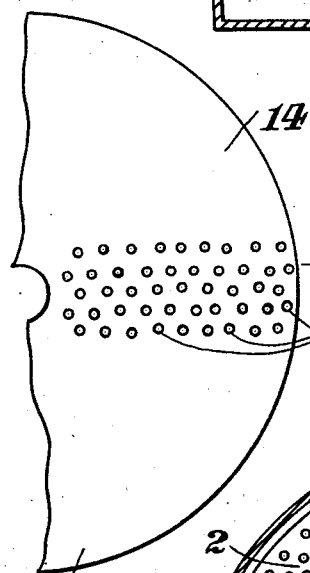
Figure 2:
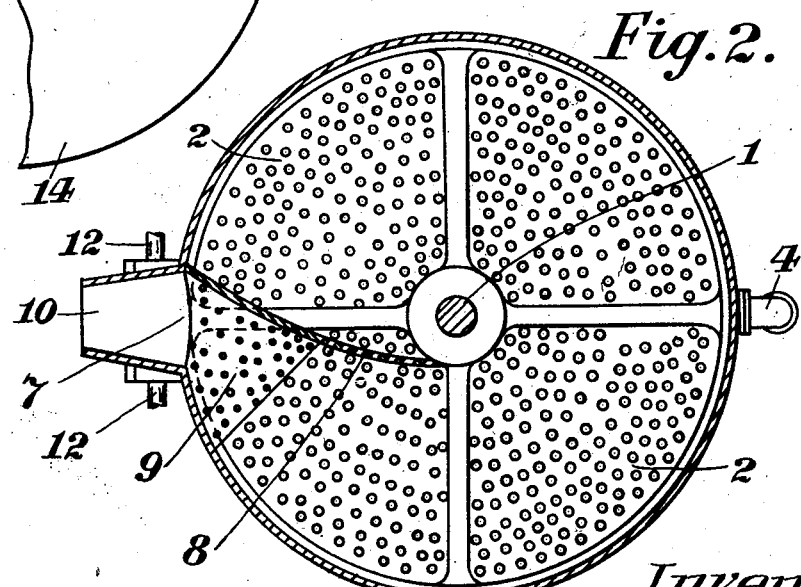

On the said drawings:—Figures 1 and 2 are, respectively, vertical and horizontal sections of one of the washers, the plate 14 being removed from Fig. 2. Fig. 3 is an inverted plan of a portion of the plate 14.

In the apparatus shown on the drawings, the coal is delivered into the washer A, which comprises an outer tank or vessel of circular shape having a vertical shaft 1 mounted centrally therein and which can be rotated by power. Secured on the shaft 1 is a disk or table 2 adapted to rotate freely inside the tank or vessel and being made with perforations therein. Secured to, and depending from, the underside of this disk or plate 2 are four (or other suitable number of) radial blades or vanes 3 which are adapted to agitate the water in the washer and are each inclined or set at an angle with its lower edge in advance of its upper edge. These blades or vanes serve to equalize the passage of the water upward through the table. Below the disk or table 2 is a water inlet pipe 4 by means of which water under pressure can be supplied to the tank or vessel. The upward flow of water prevents clogging of the perforations in the disk or table 2. Secured to the internal wall of the vessel just above the disk or table 2 is an inwardly projecting sweep 5 which extends from the circumference of the tank about halfway toward the center thereof and is arranged at the side of an opening 6 (at or about the level of the disk 2) for the passage of the dirt washed from the coal. At, or near to, the top of the vessel or tank is an outlet 7 for the coal and overflow water, and, arranged so as to project inwardly from this opening, is a sweep 8 which is partly perforated and which is of curved form and extends from the circumference of the vessel to the center thereof. The sweep 8 has, projecting from its outer portion, an inclined plate or platform 9, which is made with perforations therein and is adapted to direct the coal, floating on the water, to the discharge chute 10. From the dirt discharge opening 6 of each washer, the dirt and water passes through a valve 11 which is of tubular or hollow cylindrical form and has a longitudinal slot or gap for the passage of the dirt and water and is continuously rotated within the cylindrical casing 13, by means of the shaft 12, which may be driven in any suitable manner from the main shaft 1 and alternately receives and delivers the dirt and water supplied thereto.

For retarding the rotary motion of the coal in the washer in order to give the water time to thoroughly wash the same, there is, fitted on the top of the washer tank, or vessel, a cover or plate 14 (see Figs. 1 and 3) having, depending from its underside, a series of pins 15 which are arranged in rows and extend down to within a short distance of the perforated plate 2. The pins 15 of one row are arranged so as to be opposite the spaces between the pins of the adjacent rows. The pins are suitably arranged to suit the size of coal being washed, being fitted closer together or farther apart as required.

In operation, the water under pressure is admitted through the supply pipe 4 against the under side of the perforated table 2, thus forming a gravity washer in which the lighter coal is lifted to a higher level than the dirt, and the coal discharged from the table through the openings 7 and chute 10 while the dirt is discharged after said stratification through the outlet 6 and the valve 11.

Having now fully described my invention what I claim and desire to secure by Letters Patent is:—

1. A coal washing apparatus comprising a stationary vessel, a substantially horizontal rotatable table having apertures therein, means for supplying water to the vessel, and means for forcing said water up through the table and the material thereabove, said vessel having near its upper end an outlet for the coal and overflow water and a sweep projecting inwardly from said opening toward the center of the table, and having its inner portion perforated.

2. A coal washing apparatus comprising a stationary vessel, a rotatable table having apertures therein, means for supplying water to the vessel, and means for forcing said water up through the table and the material thereabove, said vessel having near its upper end an outlet for the coal and overflow water and a sweep projecting inwardly from said opening toward the center of the table, and inclined dividing means projecting from the outer portion of said sweep.

3. A coal washing apparatus comprising a stationary vessel, a rotatable table having apertures therein, means for supplying water to the vessel, means for forcing said water up through the table and the material thereabove, said vessel having near its upper end an outlet for the coal and overflow water and a sweep projecting inwardly from said opening toward the center of the table, and inclined dividing means projecting from the outer portion of said sweep and provided with perforations.

4. A coal washing apparatus comprising in combination a stationary vessel, a horizontally disposed rotatable perforated table therein, means for admitting water to said vessel beneath said table, means for forcing the same up through said table and the overlying material, said vessel having an outlet for the dirt above and in proximity to said table and an independent outlet for the coal and overflow water, means extending inwardly from one side of the latter opening toward the center of the table for deflecting the coal and dirt to their discharge openings, and inclined dividing means having its outer end disposed at a point between said openings.

5. A coal washing apparatus comprising in combination a stationary vessel, a horizontally disposed rotatable perforated table therein, means for admitting water to said vessel beneath said table, means for forcing the same up through said table and the overlying material, said vessel having an outlet for the dirt above and in proximity to said table and an independent outlet for the coal and overflow water, means extending inwardly from one side of the latter opening toward the center of the table for deflecting the coal and water to their discharge openings, and inclined dividing means having its outer end disposed at a point between said openings, said inclined dividing means being perforated and projecting from said first-named means.

6. A coal washing apparatus comprising in combination a stationary vessel, a perforated substantially horizontal rotatable table therein, means for supplying water to the vessel beneath the table, means for forcing water up through the table and overlying material, an inwardly projecting sweep above said table, a curved sweep extending inwardly from the circumference of the vessel to the center thereof, and an inclined dividing and conveying member extending from the outer portion of the last-named sweep adapted to discharge the lighter material and provided with perforations.

7. A coal washing apparatus comprising in combination a stationary vessel, a substantially horizontal rotatable perforated table therein, means for supplying water to the vessel, means carried by the under side of the table for equalizing the passage of water through the table, means for retarding the rotary motion of the coal on the table and a curved dividing and conveying sweep having a portion thereof perforated and extending from the circumference toward the center of the table and fixed with relation thereto and adapted to discharge the lighter material.

8. A coal washing apparatus comprising, in combination, a vessel, a rotatable table having apertures therein, means for supplying water under pressure to the underside of the table, means for agitating the water, means for retarding the rotary motion of the coal on the table and means embodying a sweep and an inclined platform adjacent thereto for discharging the washed coal from the table.

9. A coal washing apparatus comprising, in combination, a circular vessel, a vertical shaft mounted centrally within the vessel, a table with apertures therein secured on the vertical shaft, means for supplying water to the vessel, means at the underside of the table for agitating the water and means embodying a sweep and an inclined platform adjacent thereto for discharging the washed coal from the table.

10. A coal washing apparatus comprising, in combination, a vessel, a rotatable table having apertures therein, means for supplying water to the vessel, means at the underside of the table for agitating the water, means arranged above the table for retarding the rotary motion of the coal on the table and means embodying a sweep and an inclined platform adjacent thereto for discharging the washed coal from the table.

11. A coal washing apparatus comprising in combination a vessel, a rotatable table therein having apertures, means for supplying water to the vessel, means for discharging from the table the dirt washed from the coal, means for receiving and discharging the dirt washed from the coal, a curved sweep and an upwardly inclined perforated plate projecting therefrom for separately discharging the washed coal.

12. A coal washing apparatus comprising, in combination, a vessel, a rotatable table with apertures therein, means for supplying water to the vessel, a sweep projecting inward from the wall of the vessel for discharging from the table the dirt washed from the coal, a perforated sweep extending from the wall of the vessel to the center thereof for collecting the washed coal and a perforated platform arranged at an incline for receiving the coal, from the perforated sweep and discharging the same from the vessel.

13. A coal washing apparatus, comprising, in combination, a vessel, a rotatable table with apertures therein, means for supplying water to the vessel, a sweep projecting inward from the wall of the vessel for collecting from the table and discharging from the vessel the dirt washed from the coal, a valve for controlling the discharge of dirt and water from the vessel, a curved and partially perforated sweep extending from the wall of the vessel to the center thereof for collecting the coal on the table and an inclined and perforated platform secured on the face of the curved sweep for discharging from the vessel the coal collected by the curved sweep.

14. A coal washing apparatus comprising in combination a vessel, a rotatable table therein and having apertures, means for supplying water to the vessel, means for forcing said water up through the table and the material thereabove, means for discharging from the table the dirt washed from the coal, means for receiving and discharging the dirt washed from the coal, a curved sweep, and an upwardly inclined plate projecting therefrom above the discharge for the dirt for separately discharging the washed coal.

In testimony whereof I affix my signature in presence of two witnesses.

JOSEPH DODDS.

Witnesses:
 NORMAN JOHNSTON,
 H. D. FITZPATRICK.

---

Copies of this patent may be obtained for five cents each, by addressing the "Commissioner of Patents, Washington, D. C."